United States Patent Office 2,898,250
Patented Aug. 4, 1959

2,898,250

PROCESS FOR PRODUCING ALUMINUM SURFACE COATINGS

George H. Pimbley, Inglewood, Calif., assignor to Turco Products, Inc., Los Angeles, Calif., a corporation of California No Drawing. Application March 25, 1957
Serial No. 647,933

33 Claims. (Cl. 148—6.21)

This application is a continuation-in-part of my copending application Serial No. 550,825, filed December 5, 1955.

This invention relates to the art of chemically coating aluminum surfaces, and particularly to the production of substantially colorless and corrosion resistant coatings upon such surfaces. Aluminum articles containing such coatings are particularly adapted for exterior usage such as, for example, aluminum house siding. The invention is especially concerned with novel procedure for producing improved substantially colorless surface coatings on aluminum surfaces. The term "aluminum" as employed herein is intended to denote pure aluminum, commercial grade aluminum containing small amounts of other materials, and aluminum alloys, i.e., those in which aluminum predominates.

In the prior art many methods are known of producing chemical films on aluminum surfaces, some of which have been commercially advantageous and have been widely practiced for many years past. Among these are the formation of artificial oxide coatings by means of electric current in chemical baths, the immersion of clean aluminum surfaces in alkaline baths containing oxidizing compounds whereby oxide type coatings are produced, and immersion in acidic baths containing an acid which attacks aluminum, together with other components effective to form a fixed integral film or coating upon the surface, the coating produced by the latter procedure being termed a "conversion coating." It is the latter class of coatings to which the present invention relates. A brief description of this category of chemical coatings on aluminum is given below.

When an object having a surface of aluminum is cleaned free of grease and other surface soil, and is then immersed in or otherwise contacted with a solution containing anions of an acid which attacks aluminum, such as hydrofluoric acid, together with dichromate and hydrogen ions, a chemical reaction occurs which results in a fixed, integral film upon the aluminum surface. The precise nature of this reaction, and of the resulting film is not known. Probably some of the aluminum is dissolved, bringing about an increase of pH at the interface between the aluminum surface and bath liquid. The conversion coating that results is probably a gel-like amorphous complex of unknown state of chemical composition and physical structure. Generally, these coatings are thin, smooth, non-crystalline, relatively adherent and flexible, moderately lustrous, and are of yellow color, with more or less red, blue and greenish iridescence. The exact shade of color and degree of lustre differ greatly, according to which alloy of aluminum is being processed and according to the details of the processing procedure.

Chemical conversion coatings of the kind described, and as known in the prior art, have been found sufficiently advantageous to warrant increasing use by airplane manufacturers and other industrial fabricators of aluminum, as well as for building purposes. The procedures for application of such coatings have certain attractive features, including simplicity, low processing temperatures, brief contact time and feasibility of spray application.

The conversion coating formulations of the prior art generally involve the use of an acidic bath containing ions of dichromate and fluorine, and sometimes containing phosphate, arsenate, or trivalent chromium ions. In my above mentioned copending application Serial No. 550,825, I have disclosed an improved conversion coating process and composition for obtaining coatings of improved corrosion resistance and having other advantages, said composition being in the form of an aqueous acid solution containing as essential active ingredients a cation of the group II–A elements, such as beryllium, magnesium, calcium, strontium or barium, or lithium, and an anion which attacks aluminum, e.g., fluorine. Such composition also preferably includes an anion containing hexavalent chromium, molybdenum or tungsten, or mixtures thereof.

In many instances it is desirable to produce a colorless or almost colorless conversion coating without impairing the other properties of the coating, for example, its corrosion resistance, smear-proofness and uniformity. It is known in the art to treat a conversion coating formed on aluminum, with hot water to remove or leach out of the film the yellow coloration in the coating following treatment in the conversion coating bath. While this hot water treatment reduces to some degree the color of the film or coating, the latter still retains more or less iridescence mostly in the nature of red, green and blue coloration, and the operation is inconvenient and time-consuming.

Further, where the coating is quite firmly fixed, such removal of the yellow color in the above noted manner is often difficult to achieve, particularly with certain aluminum alloys. Moreover, to obtain a coating of maximum corrosion resistance, it is necessary to prolong the time of treatment in the conversion coating bath to obtain a thicker coating, and the thicker the coating, the more difficult it is to remove the yellow coloration by the above noted treatment with hot water.

It has also been attempted to produce colorless films by various manipulations and adjustments of prior art baths such as by decreasing temperature, limiting time of treatment or raising the pH of such baths.

But all of the above treatments to remove the color from the conversion coating have proved detrimental in that corrosion resistance of the coating is impaired.

One object of the invention is to produce substantially colorless coatings or films on aluminum surfaces.

Another object is the provision of aluminum conversion coatings of the aforementioned type having good corrosion resistance.

Yet another object is to provide a process for removing practically all of the color from aluminum conversion coatings without detrimental effect on corrosion resistance of the coating, or while at the same time enhancing corrosion resistance.

A still further object is the provision of procedure for simple, rapid and inexpensive treatment of aluminum for production of aluminum conversion coatings which are substantially free of color.

Other objects and advantages of the invention will be apparent from the following description of my invention.

I have found that by treatment of an aluminum article with solutions containing certain water soluble compounds having a carbon to nitrogen linkage, I can produce a substantially colorless conversion coating having good to superior corrosion resistance properties. By the term "colorless" or "substantially colorless" coatings, I mean to include coatings having a very pale or barely perceptible coloration as well as coatings which appear colorless.

The above compounds suitable for use in the invention are soluble compounds containing unsaturated tetravalent carbon linked to nitrogen and to either oxygen or sulfur. These compounds may be acyclic or heterocyclic. Preferably, I employ compounds which contain the linkages noted below, where X is oxygen or sulfur:

(1)

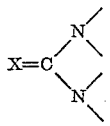

Examples of compounds having the above linkages represented by Formula 1 are urea, thiourea, cyanuric acid and thiocyanuric acid.

(2) 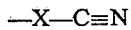 —X—C≡N

Examples of compounds having linkages represented by Formula 2 are the cyanates and thiocyanates.

Thus, for example, I can employ alkali metal or other soluble metallic cyanates and thiocyanates including chromic thiocyanate, and ammonium and alkali metal thiocyanates and cyanates, e.g., CNSK, CNSNa, CNOK and CNONa. I may also utilize soluble cyanate and thiocyanate esters such as, for example, isobutyl thiocyanate. Hence the terms "cyanates" and "thiocyanates" employed herein are intended to include the soluble salts and esters thereof. I can incorporate these compounds singly or as mixtures in the conversion coating bath itself or in solutions for treatment of the aluminum article subsequent to formation of a conversion coating thereon. The compounds which I employ are soluble to an effective degree in either type of solution; that is, such compounds are soluble at least to some effective extent in both acid and neutral solutions. Preferably these compounds are employed in the acidic conversion coating bath itself.

The preferred treating agents in my process are thiourea and thiocyanates.

Thus, according to the invention, colorless or near colorless corrosion resistant conversion coatings can be obtained conveniently and preferably in a single step during the initial formation of the conversion coating in the acidic conversion coating bath itself, or if desired, by a simple alternative procedure involving after-treatment preferably of the freshly formed conversion coating, with improved results obtained, particularly as regards good or enhanced corrosion resistance of the final coating.

The conversion coating baths in which my agents can be incorporated include those of the prior art, for example, those containing hydrogen, fluoride and dichromate ions, and which may also contain other ions such as phosphate and arsenate. A typical prior art conversion coating bath can be, for example, an aqueous solution containing sodium phosphate, sodium fluoride, potassium dichromate and an acid such as nitric acid. For best results, I prefer to incorporate the above described carbon-nitrogen reagents, in the conversion coating baths disclosed and claimed in my above copending application.

The latter baths are aqueous solutions containing (1) one or more than one of the following ions: a beryllium, magnesium, calcium, strontium, barium or lithium cation; (2) one or more than one of the following ions: an anion which attacks aluminum such as chlorine, bromine, iodine or fluorine, preferably the latter; (3) preferably also an anion containing hexavalent chromium, and (4) preferably also an anion containing molybdenum or tungsten or both. The entire disclosure of my copending application with respect to the composition of such baths is incorporated herein by reference.

According to said application, the amount of said cation or cations present can be between about .03 and about 20 grams per liter of solution, the amount of hexavalent chromium can be between about 1.3 and about 4.5 grams per liter of solution, the amount of molybdenum or tungsten or both molybdenum and tungsten employed can be between one-eighth and one-half of the amount by weight of hexavalent chromium present, and the ratio of hexavalent chromium or molybdenum or tungsten, or mixtures thereof, to fluorine can be in the range between about 0.9 and about 2.3. The acidity of the solution can be produced by an acid such as, for example, $H_2SO_4$, phosphoric or nitric acid, provided the particular acidic material utilized does not produced corrosive attack on the aluminum nor excessive insoluble material in the processing solution. The above noted quantities and ratios are given as illustrative only, and are based on the equivalent weights of these elements in elemental or ionic form.

In practice of the invention process, the aluminum surfaces of the part preferably are first cleaned free of grease and soils by conventional methods, using cleaning agents known to be effective and safe on aluminum. Cleaning residues are removed by rinsing with water, usually hot water.

If the aluminum part has an obstructive oxide coating, the surface coating is next deoxidized. This is a step in the process that may or may not be employed, depending upon the particular alloy and stock of aluminum being processed. Certain alloys, such as 61–S usually bear a surface skin of oxide, of such a nature that it is resistant to the formation of the conversion film. In such cases the oxide film must be removed, after the cleaning operation, and before contact with the conversion coating solution or bath. This oxide film removal can be accomplished by various solutions usually containing a large proportion of compound having the $SO_4$ radical, a moderate proportion of hexavalent chromium compound, and a small proportion of a fluorine compound. For aluminum alloys having considerable proportions of silicon, it is beneficial to include nitric acid in the deoxidizing treatment, either as an ingredient of the deoxidizing bath or of a separate bath employed in conjunction with the former. A typical deoxidizing solution is as follows:

| | Grams |
|---|---|
| Sodium bisulphate | 57.5 |
| Ammonium bifluoride | 1.0 |
| Potassium dichromate | 16.5 |
| Water to make one liter. | |

The surfaces of the aluminum articles are immersed in or otherwise contacted with the above solution for say five to eight minutes, at temperatures in the approximate range of 75–90° F. The surfaces are then thoroughly rinsed with cold water.

The work surfaces are then immersed in or otherwise contacted with the conversion coating solution or bath, made up according to one of the examples set forth below, or having an equivalent composition as contemplated within the scope of this application. The temperature of the bath may range from about 75 to 110° F., the preferred temperature range being about 80–90° F. for dipping, and about 90–100° F. for spray application. The time period of contact may range, for example, from 30 seconds to 10 minutes; the preferred ranges are 2 to 5 minutes for dipping, and 1 to 2 minutes for spraying.

The pH of the bath may range from about 2.0 to 3.5. However, for best results I prefer a range of about 2.2 to 2.7. If the pH is too low, the coating will not be colorless; if too high, the corrosion resistance of the coating will not be adequate. In most cases solutions made up according to this application and illustrated by the examples below, will have an initial pH a little higher than the preferred range indicated above. The pH may be brought within the preferred range by minor additions of acids or acidic substances, such as $H_2SO_4$ or nitric acid, preferably nitric acid. Such adjustment will ordinarily require not more than about 0.1% by volume of nitric acid of specific gravity 1.42, based on the volume of the bath.

The baths of my invention may contain from about 0.1 to 5.0 grams per liter, preferably about 1.5 to 3.0 grams per liter, of the above described carbon-nitrogen agents such as thiocyanate. Because of the limited solubility of cyanuric acid and thiocyanuric acid, they are best used at somewhere near the low proportion of the range mentioned above, for example, in the case of cyanuric acid around 0.7 gram per liter. Otherwise insoluble material will form, which is inconvenient and an economic waste. I have found that cyanuric acid is quite effective at about 0.5 to 1, preferably about 0.7 gram per liter.

The various materials that make up the baths of the examples below may be added separately to water to form the solution or bath, or the dry ingredients may be simply mixed and sold as a dry mixed product for incorporation in water just prior to use. In the latter case, the dry product should contain from about 5 to 25% of the above carbon-nitrogen reagents, with a preferred range of about 10 to 20%. The dry mixed product should be added to water to form the bath in an amount of about 0.1 ounce to 5 ounces per gallon of water, with a preferred range of about 1½ to 3 ounces per gallon.

After removal from the conversion coating bath the work may be simply rinsed in cold or warm water and dried in air at room temperature or by means of warm air, preferably not above 175° F.

The corrosion resistance of the conversion film or coating may be somewhat enhanced, after the conversion coating treatment, by immersion in a solution of the above described carbon-nitrogen reagents for about 5 to 30 minutes, for example, a 0.1 to 5% aqueous solution of the above described agents such as urea, thiourea, or potassium or other thiocyanate, or potassium or other soluble cyanate, or cyanuric acid or thiocyanuric acid. Such solutions may be used cold, or preferably warmed to about 150° F., but preferably not exceeding 175° F. The work is then water rinsed and dried. If desired an intervening water rinse may be advantageously employed between the conversion coating solution treatment and the treatment in the solutions just described, but is not essential.

Practice of my invention is illustrated by the following examples:

Example 1

The compositions "A" and "B" below were made by simple dry mixing. The resulting mixtures were slightly damp, granular in form, of "burnt orange" color, and free flowing.

|  | "A" | "B" |
| --- | --- | --- |
|  | Percent | Percent |
| Potassium dichromate | 63.0 | 55.5 |
| Sodium fluoborate | 16.0 | 14.2 |
| Sodium silicofluoride | 8.5 | 7.6 |
| Potassium thiocyanate | 12.5 | 22.7 |
|  | 100.0 | 100.0 |

Two test baths were prepared with substantially neutral tap water, using concentration of 1½ ounces per gallon (11.4 grams per liter) of the above compositions, "A" in one bath and "B" in the other. Solubility of the granulated solids in the baths was good; insoluble matter was very small in amount. Baths prepared with the above granulated solid products "A" and "B," after such granulated products were three days old, had pH of about 3.5 for the fresh baths. Some of the tests were carried out with fresh baths with no further pH adjustment, at pH 3.0–3.5; other work was done with the pH adjusted to 2.5 by nitric acid.

Aluminum parts composed respectively of 2S, 3S, 24S, 24S clad, 61S and 75S clad were first precleaned to remove grease and soil, and then were deoxidized in a bath of the type having the formulation given above.

The parts were then dipped in the baths made up from composition "A" and another set of like parts dipped in the baths made up from composition "B," as above described. Tests were made at the different pH values noted above. Bath temperatures were maintained between 75 and 95° F., with immersion time of about 4 to 8 minutes.

Substantially colorless conversion coatings were obtained on all of these alloys at the various pH values indicated above. The corrosion resistance of the various coatings, as tested by conventional salt spray treatment for 168 hours, was excellent on 2S, 3S, 24S clad and 61S, and was satisfactory on 24S and 75S clad, when treated in the above baths maintained at pH of about 2.5. At higher pH of 3.0 to 3.5, substantially colorless coatings were obtained, but corrosion resistance was lower.

In obtaining these improved results, the use of the above carbon-nitrogen compounds in the bath did not adversely affect the operation of the bath for producing the conversion coating, and such coating possessed smear-proofness, was quickly formed and fixed, and was uniform, with good bonding properties.

The composition of the alloys given above are as follows:

| Alloy | Composition—ingredients in percent |
| --- | --- |
| 2S | 1.0 (Si+Fe), 0.20 Cu, 0.05 Mn, 0.10 Zn, almost 99% Al. |
| 3S | 0.6 Si, 0.7 Fe, 0.20 Cu, 1.3 Mn, 0.10 Zn, about 97% Al. |
| 24S | 0.50 Si, 0.50 Fe, 4.2 Cu, 0.6 Mn, 1.5 Mg, 0.10 Cr, 0.3 Zn, 92.3 Al. |
| 61S | 0.6 Si, 0.7 Fe, 0.3 Cu, 0.1 Mn, 1.0 Mg, 0.2 Cr, 0.3 Zn, 96.8 Al. |
| 75S | 0.50 Si, 0.7 Fe, 1.6 Cu, 0.3 Mn, 2.5 Mg, 5.6 Zn, 0.3 Cr, 88.5 Al. |

The following are further illustrative examples of aluminum conversion coating solutions according to the invention, two alternative baths being given in each of Examples 2 to 5:

Example 2

|  | Grams per Liter | |
| --- | --- | --- |
| Potassium dichromate—$K_2Cr_2O_7$ | 9.7 | 8.65 |
| Sodium fluoborate—$NaBF_4$ | 2.5 | 2.20 |
| Sodium silicofluoride—$Na_2SiF_6$ | 1.3 | 1.15 |
| Potassium thiocyanate—KCNS | 1.5 | 3.00 |
| Water to make 1 liter. | | |

Example 3

|  | Grams per Liter | |
| --- | --- | --- |
| Calcium dichromate—$CaCr_2O_7 \cdot 4\frac{1}{2} H_2O$ | 8.8 | 7.8 |
| Sodium silicofluoride—$Na_2SiF_6$ | 3.9 | 3.5 |
| Boric acid—$H_3BO_3$ | 0.8 | 0.7 |
| Potassium thiocyanate—KCNS | 1.5 | 3.0 |
| Water to make 1 liter. | | |

Example 4

|  | Gram per Liter | |
| --- | --- | --- |
| Calcium dichromate—$CaCr_2O_7 \cdot 4\frac{1}{2} H_2O$ | 8.0 | 8.8 |
| Sodium silicofluoride—$Na_2SiF_6$ | 3.8 | 4.2 |
| Chromium trioxide—$CrO_3$ | 0.5 | 0.5 |
| Chromic thiocyanate—$Cr(CNS)_3$ | 2.7 | 1.5 |
| Water to make 1 liter. | | |

Example 5

|  | Grams per Liter | |
| --- | --- | --- |
| Potassium dichromate—$K_2Cr_2O_7$ | 9.7 | 8.65 |
| Sodium fluoborate—$NaBF_4$ | 2.5 | 2.20 |
| Sodium silicofluoride—$Na_2SiF_6$ | 1.3 | 1.15 |
| Potassium cyanate—KCNO | 1.5 | 3.00 |
| Water to make 1 liter. | | |

Example 6

| | Grams per liter |
|---|---|
| Potassium dichromate—$K_2Cr_2O_7$ | 9.1 |
| Sodium silicofluoride—$Na_2SiF_6$ | 4.4 |
| Chromic nitrate—$Cr(NO_3)_3.9H_2O$ | 0.7 |
| Cyanuric acid—$(HNCO)_3.2H_2O$ | 0.8 |
| Water to make 1 liter. | |

Example 7

| | Grams per liter |
|---|---|
| Calcium dichromate—$CaCr_2O_7.4\frac{1}{2}H_2O$ | 9.0 |
| Sodium silicofluoride—$Na_2SiF_6$ | 4.0 |
| Chromic nitrate—$Cr(NO_3)_3.9H_2O$ | 0.6 |
| Thiourea—$NH_2CSNH_2$ | 1.4 |
| Water to make 1 liter. | |

Example 8

| | Grams per liter |
|---|---|
| Calcium dichromate—$CaCr_2O_7.4\frac{1}{2}H_2O$ | 8.7 |
| Sodium silicofluoride—$Na_2SiF_6$ | 3.9 |
| Thiourea—$NH_2CSNH_2$ | 2.4 |
| Water to make 1 liter. | |

Example 9

| | Grams per liter |
|---|---|
| Calcium dichromate—$CaCr_2O_7.4\frac{1}{2}H_2O$ | 8.7 |
| Sodium silicofluoride—$Na_2SiF_6$ | 3.9 |
| Urea—$NH_2CONH_2$ | 2.4 |
| Water to make 1 liter. | |

Example 10

| | Grams per liter |
|---|---|
| Potassium dichromate—$K_2Cr_2O_7$ | 9.1 |
| Sodium silicofluoride—$Na_2SiF_6$ | 4.4 |
| Chromic nitrate—$Cr(NO_3)_3.9H_2O$ | 0.7 |
| Thiocyanuric acid—$(NHCS)_3$ | 0.8 |
| Water to make 1 liter. | |

Results with respect to obtaining colorless and corrosion resistant coatings on aluminum employing the baths of Examples 7 and 8 containing thiourea are similar to the results noted in Example 1 and also obtainable using the baths of Examples 2 to 4 employing thiocyanate. Such results are somewhat superior to those obtainable employing cyanate, cyanuric acid, urea, or thiocyanuric acid as in Examples 5, 6, 9 and 10. In a few instances the coatings produced exhibited a barely perceptible very slight green, blue or yellow tinge when the pieces were tilted at angles to the light.

While the above described procedure involving incorporation of the carbon-nitrogen agents in the conversion coating bath itself is preferred and produces best results, I can alternatively treat the colored conversion coating, produced by conventional conversion coating baths or by treatment in the conversion coating baths of my copending application, as described above, but not containing my carbon-nitrogen type agents, with an aqueous solution of my agents following production of the colored conversion coating.

According to this procedure, after formation of the coating in the conversion coating bath to produce a film normally having a coloration ranging from light yellow thru golden to brown, the article is treated in an aqueous solution of the above described thiocyanate, cyanate, thiourea, urea, cyanuric acid or thiocyanuric acid. Concentration of these agents in the solution is preferably from 0.1 to 5% by weight of the aqueous solution, but this range is not critical. Cold or heated solutions of this type can be employed. Preferably, these solutions should be warm (100–120° F.) but need not be hot. The preferred agents in this mode of procedure are also thiourea and the thiocyanates. The following example illustrates application of this procedure:

Example 11

A piece of 24S aluminum was dipped in a conversion coating bath formulated as follows for a period of several minutes:

| | Grams |
|---|---|
| Calcium chromate | 3.97 |
| Sodium fluoborate | 1.26 |
| Sodium molybdate | .37 |
| Nitric acid, 40 deg. Bé | 3.67 |
| Water to make one liter. | |

A deep golden colored film was obtained.

The fresh film was rinsed with water and then dipped in a solution of water containing 4% potassium thiocyanate by weight for several minutes. The coating was then rinsed and dried.

The procedure was repeated with other similar pieces of 24S aluminum, but employing an after-treatment of the conversion coating as described above with a 4% thiourea aqueous solution instead of the thiocyanate solution.

In the treatment as above described in Example 11, it was found that in both cases (use of thiocyanate or thiourea) the golden coloration of the film formed by treatment in the conversion coating bath was transformed into a substantially colorless film. Further, it was found that the thiocyanate or thiourea treatment did not impair the corrosion resistance of the conversion coating even where the coating or film was relatively thin.

It will of course be understood that the concentration of my carbon-nitrogen agents employed in the working solutions, e.g., the conversion coating bath itself or an after-treatment solution, and also the time of treatment of the aluminum article in such baths can vary depending, for example, upon the particular agent employed, the operating temperature of the solution, the nature and thickness of the conversion coatings formed and the nature of the aluminum article being treated, and especially, in the case of the after-treatment procedure, on the degree of coloration imparted to the coating in the conversion coating bath.

If desired, other materials may be included in the conversion coating bath or the after-treatment bath, in addition to the carbon-nitrogen agents described above. Thus, for example, I may incorporate wetting agents, such as an alkyl phenol-ethylene oxide condensate, or an alkyl aryl sulphonate in such baths to increase the effectiveness thereof, although these additives are not required.

While the above procedures and solutions containing the carbon-nitrogen agents of the invention have been mostly described in connection with treatment of the aluminum parts by dipping application in such solutions or baths, the aluminum parts may also be treated by spraying, brushing or swabbing applications of such solutions.

Certain other materials can also be used for decolorizing aluminum coatings of the above described nature in the after-treatment of the type illustrated by Example 11. These materials include water soluble substances such as, e.g., ammonium and alkali metal sulfites, phosphites and hypophosphites, chromic nitrate, stannous fluoride or chloride, phosphorous acid, hydrazine hydrate, alkali metal hydrosulfite, hexamethylenetetramine and sodium thiosulfate. Other materials which may also be employed in my process are alkali metal sulfides and polysulfides such as sodium sulfide and sodium polysulfide, thiuram sulfide and disulfides such as tetramethyl thiuram sulfide and tetramethyl thiuram disulfide, thiono- and thio carbamates, substituted ureas such as ethyl urea and dimethyl urea, alkyl and aryl substituted thioureas such as diethyl and diphenyl thiourea, ethyl thio carbamate ($C_2H_5SCNH_2$) and ethyl thiono carbamate ($C_2H_5OSCNH_2$), and alkyl and aryl mercaptans such as ethyl mercaptan and phenyl mercaptan.

From the foregoing, it is seen that I have developed a process for rendering aluminum conversion coatings susbtantially colorless, while at the same time enhancing the thickness, toughness and corrosion resistance of the coating. The protective coatings of this invention are useful in those cases where it is desired to retain the bright, lustrous, colorless appearance of metallic aluminum. Such surfaces are usually not painted, although aluminum treated by this process may be painted, if desired, or it may be coated with clear organic films, or given other supplementary finishes. It is especially important that the unpainted surfaces have adequate corrosion resistance, and where a paint is to be applied to the surface of the coating, the coated surface should also have adequate adhesive properties to firmly bond with paints and other supplementary finishes. My process produces coatings possessing all of these essential qualities While I have described particular embodiments of my invention for the purpose of illustration, it should be understood that various modifications and adaptations thereof may be made within the spirit of the invention as set forth in the appended claims.

I claim:

1. A process for producing a substantially colorless chemically bonded coating on an aluminum article, which comprises treating said article in an aqueous solution containing a small effective amount of a soluble compound containing unsaturated tetravalent carbon linked to nitrogen and to an element of the group consisting of oxygen and sulfur.

2. A process as defined in claim 1, wherein said compounds have the linkages represented by the formula

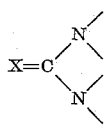

where X is an element of the group consisting of oxygen and sulfur.

3. A process for producing a substantially colorless chemically bonded coating on an aluminum article, which comprises treating said article in an aqueous solution containing a small effective amount of a compound of the group consisting of a soluble thiocyanate, a soluble cyanate, thiourea, urea, cyanuric acid and thiocyanuric acid.

4. A process for producing a substantially colorless chemically bonded coating on an aluminum article, which comprises forming a chemical coating on said article by treatment in an aluminum conversion coating bath, and treating said coating with an aqueous solution containing a small effective amount of a compound of the group consisting of a soluble thiocyanate, a soluble cyanate, thiourea, urea, cyanuric acid and thiocyanuric acid.

5. A process for producing a substantially colorless chemically bonded coating on an aluminum article, which comprises contacting said article with an aqueous acid aluminum conversion coating bath, said bath comprising a fluorine-containing anion, and an anion containing hexavalent chromium, and contacting said coating with an aqueous solution containing a small effective amount of a soluble compound containing unsaturated tetravalent carbon linked to nitrogen and to an element of the group consisting of oxygen and sulfur.

6. A process for producing a substantially colorless chemically bonded coating on an aluminum article, which comprises treating said article in an aqueous acid solution comprising a fluorine-containing anion, an anion containing hexavalent chromium and a small effective amount of a soluble compound containing unsaturated tetravalent carbon linked to nitrogen and to an element of the group consisting of oxygen and sulfur.

7. A process for producing a substantially colorless chemically bonded coating on an aluminum article, which comprises contacting said article with an aqueous acid aluminum conversion coating bath, said bath comprising a fluorine-containing anion, and an anion containing hexavalent chromium, and contacting said coating with an aqueous solution containing a small effective amount of a compound of the group consisting of a soluble thiocyanate, a soluble cyanate, thiourea, urea, cyanuric acid and thiocyanuric acid.

8. A process for producing a substantially colorless chemically bonded coating on an aluminum article, which comprises treating said article in an aqueous acid solution comprising a fluorine-containing anion, an anion containing hexavalent chromium and a small effective amount of a compound of the group consisting of a soluble thiocyanate, a soluble cyanate, thiourea, urea, cyanuric acid and thiocyanuric acid.

9. A process for producing a substantially colorless chemically bonded coating on an aluminum article, which comprises treating said article in an aqueous acid solution having a pH in the range from about 2.0 to 3.5 and comprising a fluorine-containing anion, an anion containing hexavalent chromium and 0.1 to 5 grams per liter of a compound of the group consisting of a soluble thiocyanate, a soluble cyanate, thiourea, urea, cyanuric acid and thiocyanuric acid.

10. A process as defined in claim 8, said compound being an alkali metal thiocyanate.

11. A process as defined in claim 8, said compound being thiourea.

12. A process as defined in claim 8, said compound being an alkali metal cyanate.

13. A process as defined in claim 8, said compound being urea.

14. A process as defined in claim 8, said compound being cyanuric acid.

15. A process for producing a substantially colorless chemically bonded coating on an aluminum article, which comprises treating said article in an aqueous acid solution comprising a fluorine-containing anion, an anion containing hexavalent chromium, a member of the group consisting of beryllium, magnesium, calcium, strontium and barium, and a small effective amount of a compound of the group consisting of a soluble thiocyanate, a soluble cyanate, thiourea, urea, cyanuric acid and thiocyanuric acid.

16. A process for producing a substantially colorless chemically bonded coating on an aluminum article, which comprises treating said article in an aqueous acid solution comprising a fluorine-containing anion, an anion containing hexavalent chromium, an anion containing an element of the group consisting of molybdenum and tungsten, a member of the group consisting of beryllium, magnesium, calcium, strontium and barium, and a small effective amount of a compound of the group consisting of a soluble thiocyanate, a soluble cyanate, thiourea, urea, cyanuric acid and thiocyanuric acid.

17. A process for producing a substantially colorless chemically bonded coating on an aluminum article, which comprises treating said article in an aqueous acid solution having a pH in the range from about 2.0 to 3.5 comprising a fluorine-containing anion, an anion containing hexavalent chromium, a member of the group consisting of beryllium, magnesium, calcium, strontium and barium, and 0.1 to 5 grams per liter of a compound of the group consisting of a soluble thiocyanate, a soluble cyanate, thiourea, urea, cyanuric acid and thiocyanuric acid.

18. A process as defined in claim 17, said compound being an alkali metal thiocyanate.

19. A process as defined in claim 17, said compound being thiourea.

20. A process for producing a substantially colorless chemically bonded coating on an aluminum article, which comprises treating said article with an aqueous acid aluminum conversion coating bath, said bath comprising a fluorine-containing anion and an anion containing hexavalent chromium, forming a colored conversion coating on said article, and contacting said colored fresh aluminum conversion coating with an aqueous solution containing a small effective amount of a soluble compound containing unsaturated tetravalent carbon linked to nitrogen and to an element of the group consisting of oxygen and sulfur.

21. A process for producing a substantially colorless chemically bonded coating on an aluminum article, which comprises treating said article with an aqueous acid aluminum conversion coating bath, said bath comprising a fluorine-containing anion and an anion containing hexavalent chromium, forming a colored conversion coating on said article, and contacting said colored fresh aluminum conversion coating with an aqueous solution of a small effective amount of a compound of the group consisting of a soluble thiocyanate, a soluble cyanate, thiourea, urea, cyanuric acid and thiocyanuric acid.

22. A process for producing a substantially colorless chemically bonded coating on an aluminum article, which comprises treating said article with an aqueous acid aluminum conversion coating bath, said bath comprising a fluorine-containing anion, and an anion containing hexavalent chromium, forming a colored conversion coating on said article, and contacting said colored fresh aluminum conversion coating with an aqueous solution of a small effective amount of an alkali metal thiocyanate.

23. A process for producing a substantially colorless chemically bonded coating on an aluminum article, which comprises treating said article with an aqueous acid aluminum conversion coating bath, said bath comprising a fluorine-containing anion, and an anion containing hexavalent chromium, forming a colored conversion coating on said article, and contacting said colored fresh aluminum conversion coating with an aqueous solution of a small effective amount of thiourea.

24. A bath for producing a chemically bonded coating on an aluminum article, which comprises an aqueous acid solution comprising a fluorine-containing anion, an anion containing hexavalent chromium and a small effective amount of a soluble compound containing unsaturated tetravalent carbon linked to nitrogen and to an element of the group consisting of oxygen and sulfur.

25. A bath for producing a chemically bonded coating on an aluminum article, which comprises an aqueous acid solution having a pH in the range from about 2.0 to 3.5 and comprising a fluorine-containing anion, an anion containing hexavalent chromium and 0.1 to 5 grams per liter of a compound of the group consisting of a soluble thiocyanate, a soluble cyanate, thiourea, urea, cyanuric acid and thiocyanuric acid.

26. A process for producing a substantially colorless chemically bonded coating on an aluminum article, which comprises treating said article in an aqueous solution containing a small effective amount of a soluble compound having the linkages represented by the formula

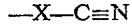

where X is an element of the group consisting of oxygen and sulfur.

27. A bath for producing a chemically bonded coating on an aluminum article, which comprises an aqueous acid solution comprising a halogen-containing anion, an anion containing hexavalent chromium, and a small effective amount of a soluble thiocyanate, a soluble cyanate, thiourea, urea, cyanuric acid and thiocyanuric acid.

28. A process for producing a substantially colorless chemically bonded coating on an aluminum article, which comprises treating said article in an aqueous acid solution comprising an anion which attacks aluminum, an anion containing hexavalent chromium and a small effective amount of a compound of the group consisting of a soluble thiocyanate, a soluble cyanate, thiourea, urea, cyanuric acid and thiocyanuric acid.

29. A process for producing a substantially colorless chemically bonded coating on an aluminum article, which comprises treating said article in an aqueous solution containing a halogen-containing anion, and a small effective amount of a compound of the group consisting of a soluble thiocyanate, a soluble cyanate, thiourea, urea, cyanuric acid and thiocyanuric acid.

30. In a solid composition of matter for preparation of baths for producing a chemically bonded coating on an aluminum article, of the type having as essential ingredients thereof a mixture of compounds including fluorine and hexavalent chromium; the improvement of a soluble compound as a decolorizing agent in said composition, the last mentioned compound having an unsaturated tetravalent carbon linked to nitrogen and to an element of the group consisting of oxygen and sulfur, said last-mentioned compound being present in amount of from about 5% to about 25% by weight of said composition.

31. In a solid composition of matter for preparation of baths for producing a chemically bonded coating on an aluminum article, of the type having as essential ingredients thereof a mixture of compounds including fluorine and hexavalent chromium; the improvement of a soluble compound as a decolorizing agent in said composition, the last mentioned compound being chosen from the group consisting of a soluble thiocyanate, a soluble cyanate, thiourea, urea, cyanuric acid and thiocyanuric acid, said last-mentioned compound being present in amount of from about 5% to about 25% by weight of said composition.

32. In a solid composition of matter for preparation of baths for producing a chemically bonded coating on an aluminum article, of the type having as essential ingredients thereof a mixture of compounds including fluorine and hexavalent chromium, and further including a compound containing a member of the group consisting of beryllium, magnesium, calcium, strontium and barium; the improvement of a soluble compound as a decolorizing agent in said composition, the last-mentioned compound having an unsaturatded tetravalent carbon linked to nitrogen and to an element of the group consisting of oxygen and sulfur, said last-mentioned compound being present in amount of from about 5% to about 25% by weight of said composition.

33. In a solid composition of matter for preparation of baths for producing a chemically bonded coating on an aluminum article, of the type having as essential ingredients thereof a mixture of compounds including halogen and hexavalent chromium; the improvement of a soluble compound as a decolorizing agent in said composition, the last mentioned compound being chosen from the group consisting of a soluble thiocyanate, a soluble cyanate, thiourea, urea, cyanuric acid and thiocyanuric acid, said last-mentioned compound being present in amount of from about 5% to about 25% by weight of said composition.

References Cited in the file of this patent

UNITED STATES PATENTS

| | | |
|---|---|---|
| 2,105,672 | Sadtler | Jan. 18, 1938 |
| 2,438,877 | Spruance | Mar. 30, 1948 |
| 2,494,910 | Spruance | Jan. 17, 1950 |